Oct. 2, 1951  J. H. EMERSON  2,569,849
APPARATUS FOR MEASURING THE VOLUMES OF
PERIODICALLY RECURRING FLUID FLOWS
Filed March 23, 1948  3 Sheets-Sheet 1
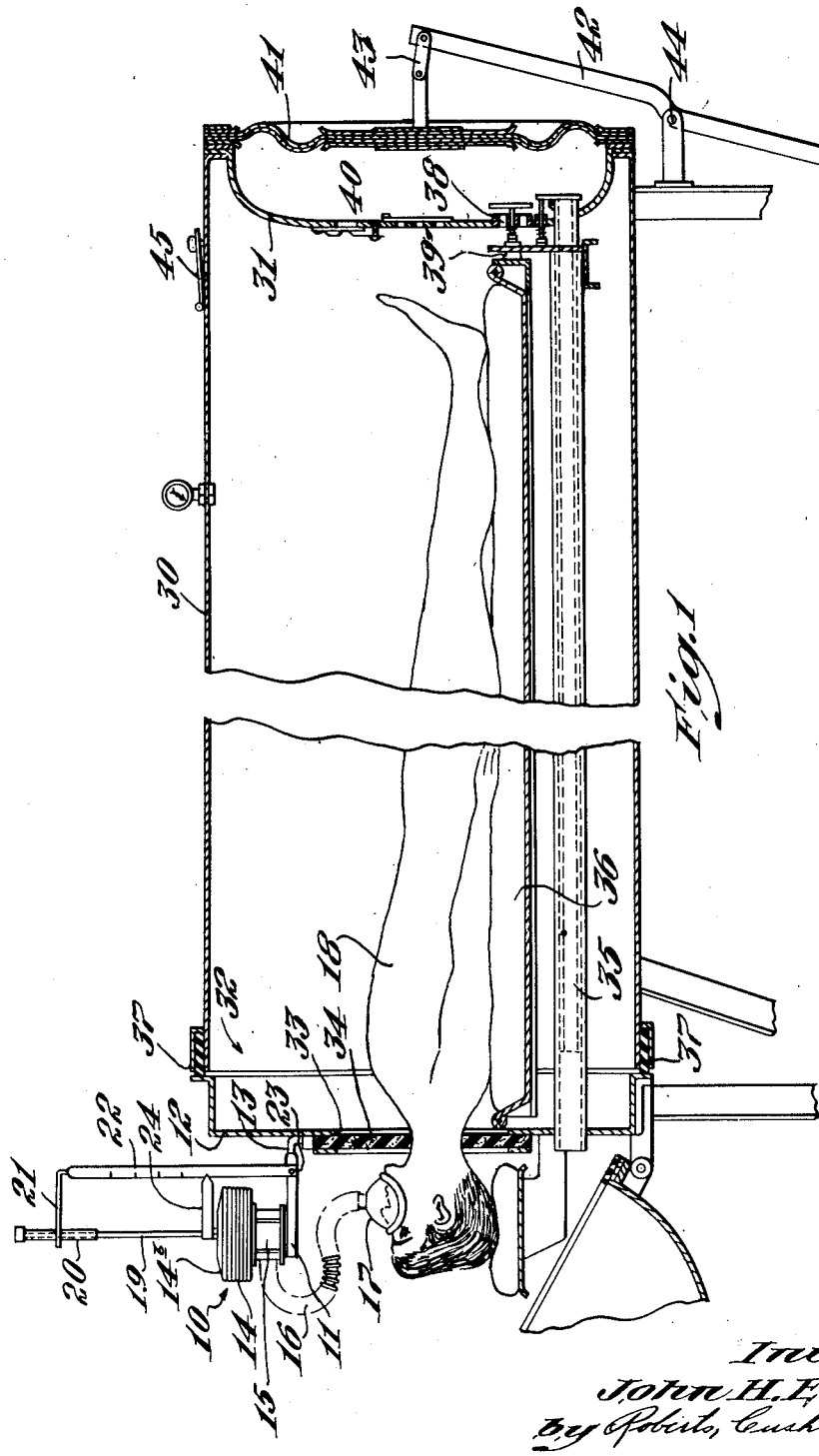
Inventor
John H. Emerson
By Roberts, Cushman & Grover
attys.

Oct. 2, 1951         J. H. EMERSON         2,569,849
APPARATUS FOR MEASURING THE VOLUMES OF
PERIODICALLY RECURRING FLUID FLOWS
Filed March 23, 1948         3 Sheets-Sheet 2
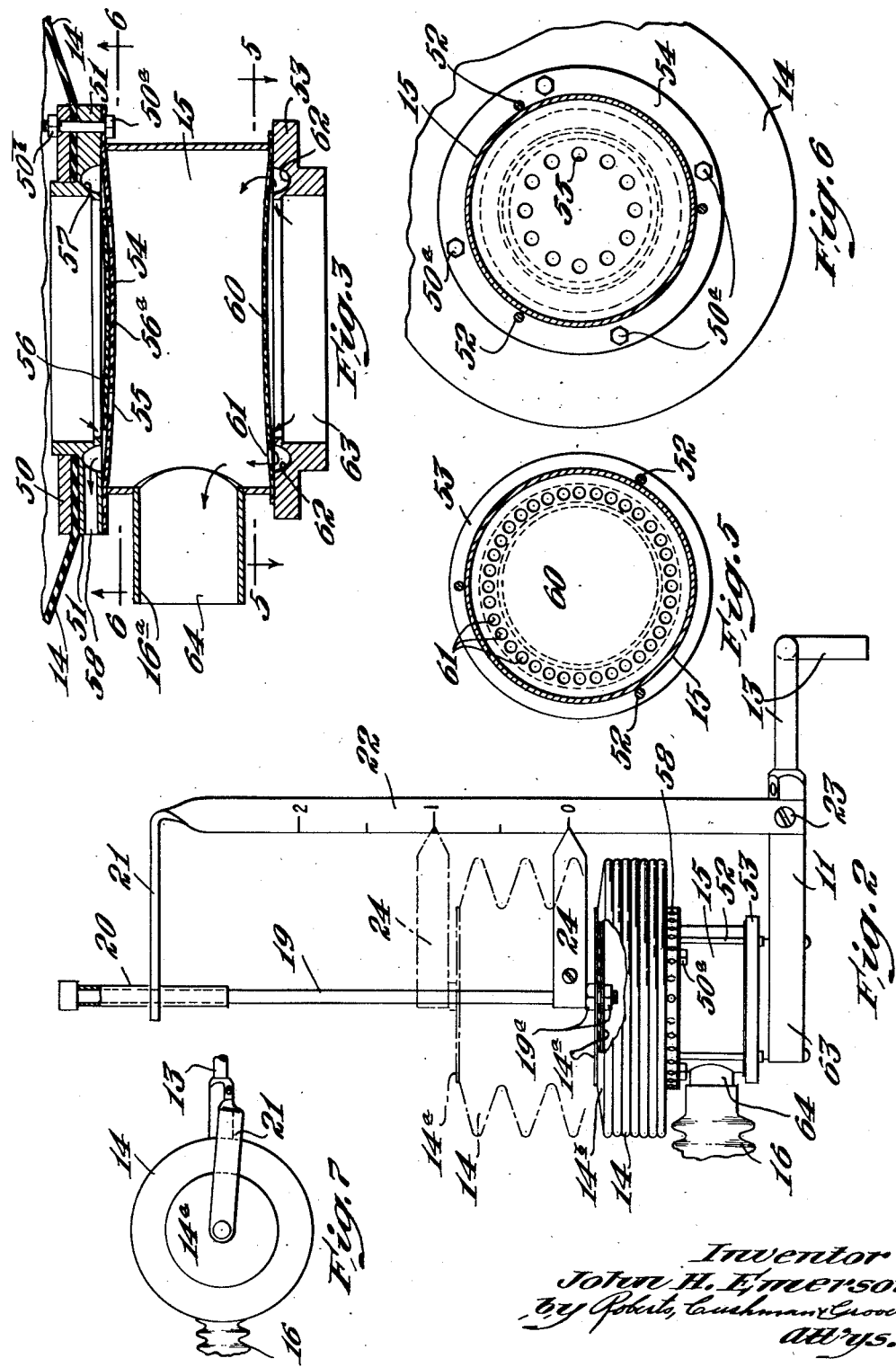

Oct. 2, 1951   J. H. EMERSON   2,569,849
APPARATUS FOR MEASURING THE VOLUMES OF
PERIODICALLY RECURRING FLUID FLOWS
Filed March 23, 1948   3 Sheets-Sheet 3
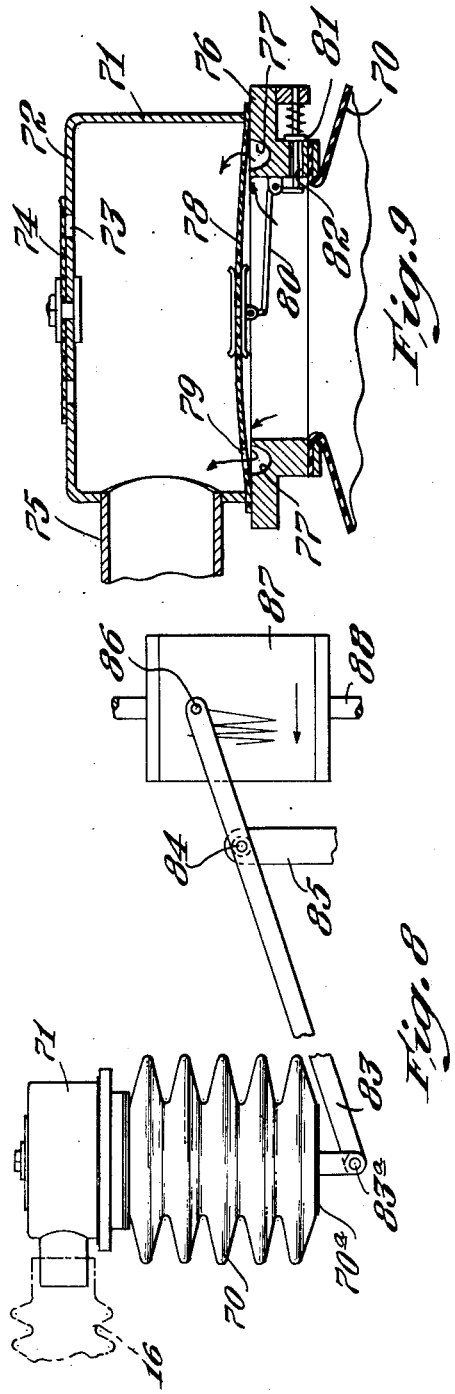
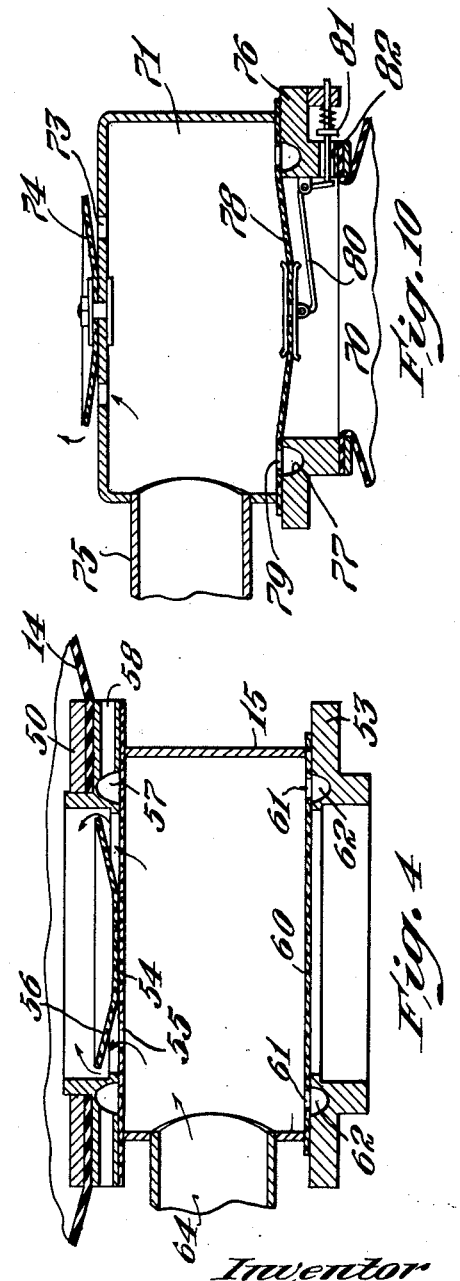
Inventor
John H. Emerson
by Roberts, Cushman & Grover
Att'ys.

Patented Oct. 2, 1951

2,569,849

UNITED STATES PATENT OFFICE 2,569,849

APPARATUS FOR MEASURING THE VOLUMES OF PERIODICALLY RECURRING FLUID FLOWS

John H. Emerson, Cambridge, Mass.

Application March 23, 1948, Serial No. 16,418

20 Claims. (Cl. 128—2.08)

This invention relates to apparatus for indicating the volume of periodically recurring fluid flows and more particularly to respiration measuring apparatus for indicating the volume of either the inhaled or exhaled gases of a breathing patient.

In the operation of an artificial respirator or the like, it is desirable to ascertain its effectiveness on the patient by determining the volume of gases either inhaled or exhaled by the patient during each respiration induced by the respirator thereby indicating the adjustment of the respirator controls which is required to induce the desired depth of respiration.

The principal object of this invention is to provide apparatus for measuring or indicating the volume of periodically recurring flows of fluid or gas to or from a patient's lungs.

A further object is to provide apparatus suitable for embodiment in artificial respirators in common use to measure the volume of either the inhaled or the exhaled gases thereby to indicate the effectiveness of the respirator and enable its adjustment for the desired operation.

Further objects are to provide a novel form of respiration indicator adapted for operation to measure the volume of either inhaled or exhaled gases without interference with continuous respiration, and to provide such a device with recording apparatus adapted to continuously record the volume of either the inhaled or exhaled gases for any desired period of time.

A further object is to provide apparatus for measuring the volume of periodically recurring fluid flows which is simple and economical in construction.

The apparatus of this invention may be effectively used to measure the volume of either inhaled or exhaled gases by a freely breathing patient to thus ascertain the normal lung capacity of the subject, which information may be important in connection with treatment of diseases of the respiratory system or in administering anesthesia.

According to one aspect of this invention, an expansible chamber is provided which is adapted to contain the volume of each fluid flow to be measured and the relative displacement of said chamber is utilized to indicate the volume of each recurrent fluid flow.

In the apparatus of one embodiment of this invention adapted to measure the volumes of recurrent fluid flows from a breathing subject to thus measure the respiratory volume during either each period of inhalation or each period of exhalation, I provide valve mechanism to open communication between an expansible chamber and the respiratory system during each period of exhalation and to close the aforesaid communication during each period of inhalation and valve mechanism which substantially simultaneously with the closure of said communication is operative to open communication between the respiratory system of the patient and a source of fluid under substantially constant pressure such as a supply of oxygen, air, the atmosphere or a mixture of anesthetic gases or the like.

According to one embodiment of this invention, an expansible chamber is provided having an associated valve chamber and valve mechanisms including an automatically controlled inlet and outlet valve assembly between the valve chamber and the expansible chamber. A flexible conduit is also provided for connecting the valve chamber to the respiratory system or the fluid flow of volume to be measured and the arrangement of the valves and the expansible chamber is such as to cause the expansion of the chamber by the fluid flow from the patient's respiratory system, and further to cause the expansible chamber to be retracted upon cessation or reversal of the flow of fluid during inhalation. Thus during each inhalation the expansible chamber and associated indicating apparatus are automatically detracted for subsequent expansion and the indication of the volume of the next recurrent flow of exhaled gases to be measured.

The valve chamber in the apparatus according to one embodiment of this invention may be further characterized by having an intake valve assembly for connecting the flexible conduit with the atmosphere, a supply of oxygen, anesthetic or the like; the intake valve being automatically opened by inhalation of the patient which is substantially simultaneously with commencement of the contraction of the expansible chamber to thus enable the apparatus to be continuously used on a breathing patient periodically to indicate or measure the volume of exhaled gases and to supply air, oxygen, anesthetic, or the like for inhalation by the patient.

Indicating mechanism may also be operatively associated with the expansible chamber to thereby indicate the amount of its expansion or retraction and hence the volume of fluid flow being measured, and such indicating mechanism may be of the direct reading type or it may be of the continuously recording type.

In another embodiment of the invention, the expansible chamber and associated valve mechanism are so arranged as to permit the chamber to expand and fill with gas or air during each period of exhalation of the subject, and to cause the expansible chamber to be connected to the patient's respiratory system during each period of inhalation so that he inhales gas, air, or the like from the expansible chamber causing it to retract during each period of inhalation. In such modification of the invention, the amount of retraction of the expansible chamber indicates the volume of gas or air being inhaled by the subject during each period of inhalation.

Other objects relate to the construction and mode of operation and will be apparent from a consideration of the following description and the accompanying drawings which illustrate certain embodiments of the invention chosen for the purposes of illustration.

In the drawings,

Fig. 1 is a side elevation partly in vertical section and showing one embodiment of the fluid flow measuring apparatus of this invention installed upon an artificial respirator and with the face mask in place upon a patient ready to measure the volume of exhaled gases during recurrent respirations;

Fig. 2 is an enlarged side elevation with parts broken away of the measuring apparatus of Fig. 1 with the expansible chamber in the contracted position and showing in dot dash lines the chamber in partially expanded position;

Fig. 3 is an enlarged fragmentary vertical section of the measuring apparatus of Figs. 1 and 2, showing the positions of the parts during each period of inhalation;

Fig. 4 is an enlarged fragmentary vertical section of the apparatus of Figs. 1 and 2, showing the positions of the parts during each period of exhalation;

Fig. 5 is a reduced section taken on line 5—5 of Fig. 3;

Fig. 6 is a reduced section taken on the line 6—6 of Fig. 3;

Fig. 7 is a reduced plan view of the apparatus shown in Fig. 2;

Fig. 8 is a side elevation of another embodiment of the invention;

Fig. 9 is an enlarged fragmentary vertical section of the apparatus of Fig. 8, showing the positions of the parts during each period of inhalation; and Fig. 10 is a view similar to Fig. 9, but showing the positions of the parts during each period of exhalation.

Referring to Fig. 1 of the drawings, one embodiment of fluid flow measuring device of this invention adapted to indicate the volume of exhaled gases is generally shown at 10, having a base 11 which is detachably secured to the end wall 12 of an artificial respirator by the arm 13, one end of which is secured to the base 11 and the other end of which detachably fits within a socket (not shown) or other suitable holder on the end wall 12 of the respirator.

The measuring device 10 comprises an expansible chamber or bellows 14 which may be formed of any suitable material such as vulcanized rubber. The expansible chamber 14 is mounted at its lower end upon a metal valve chamber or box 15. The interior of the flexible conduit 16, which may be formed of vulcanized rubber or the like, communicates with the interior of the valve chamber 15 through the tube 64, Fig. 2. The other end of the flexible conduit 16 is connected to a hollow face mask 17 which is adapted to surround the nose and mouth of a patient 18 whose respiration is to be measured.

The upper end of the expansible chamber 14 is formed by a pair of disks 14a (Fig. 2) which grip the inturned flange 14b formed at the upper end of the expansible chamber. The disks 14a are fastened to a guide rod 19 by a pair of interiorly threaded nuts 19a, one being located above the upper disk 14a and the other being located within the expansible chamber and beneath the lower disk 14a. These nuts force the disks 14a toward each other and cause them to grip the flange 14b and to form an air-tight seal at the top of the bellows.

The guide rod 19 is slidable longitudinally of the bearing 20 which is carried by the upper end 21 of the indicator scale 22. The lower end of the indicator scale 22 is fastened to the base 11 by the screw 23. An indicator pointer 24 is fastened to the rod 19 to thus indicate the displacement or the amount of expansion of the bellows as shown by the dot dash position of Fig. 2.

Since the volume measuring device of this invention is particularly adapted to indicate the effectiveness of artificial respiration induced by a respirator, a brief description of such machine will be made herein although the artificial respirator shown is of the type more fully described in United States Letters Patent 2,427,665, to which reference is made for a more complete description.

As shown in Fig. 1 of the drawings, the artificial respirator is comprised of a casing 30 having at one end a fixed end wall 31 and at the other end an opening 32 which is adapted to be closed by the removable end wall 12. The removable end wall 12 is provided with an opening 33 large enough to permit the passage of the head of the patient 18 therethrough. A seal is provided between the edge of this opening and the patient's neck, for example by a sponge rubber collar 34. A bed 36 has one end attached to the removable end wall 12 and it is supported upon the inner walls of the casing 30 for sliding movement outwardly and inwardly of the casing.

When the bed 36 supporting the patient 18 is slid into the casing 30 and the opening 32 is sealed at 37 to the end wall 12 (as shown in Fig. 1), the valve 38 is automatically opened by the lug 39 to permit communication between the casing 30 and the pressure-varying unit 40 through the fixed end wall 31. The pressure-varying unit 40 includes a flexible diaphragm 41 which is reciprocated by the operating arm 42 linked thereto at 43 and pivoted at 44. The free end of the operating arm is reciprocated in any suitable manner such as by an electric motor (not shown).

Considering the operation of the invention thus far described, it will be noted that suitable reciprocation of the operating arm 42 produces alternate periods of negative and atmospheric or positive pressures within the casing 30 which are controlled in maximum amounts by adjustment of the leak valve 45. In such manner artificial respiration is induced and corresponding inhalations and exhalations of gases through the flexible conduit 16 result.

The valve chamber 15 is provided with a suitable valve mechanism to be more fully described hereinafter in connection with Figs. 2 to 6 of the drawings, which mechanism permits inhalation by the patient through the conduit 16 from the atmosphere and exhalation by the patient through the conduit 16 to the interior of the tially constant pressure such as the atmosphere. During each period of inhalation, negative pressure is created within the valve chamber 71 effecting operation of the valve mechanisms to close communication between the interior of the valve chamber and the atmosphere and to open communication between the interior of the valve chamber and the interior of the collapsible chamber, so that the inhaled volume of air must be drawn from the interior of the collapsible chamber 70. Thus during each inhalation, a negative pressure is created in the bellows 70 to cause it to retract by an amount substantially equal to the volume of the inhaled gases and the amount of such retraction is indicated in any suitable manner such as by movement of the pointer 86 along the record surface 87.

To achieve the operation described above, valve mechanisms of the type shown in Figs. 9 and 10 of the drawings are employed. In Fig. 9, the valve mechanisms are shown in the positions they assume during each period of inhalation while in Fig. 10 the valve mechanisms are shown in the positions they assume during each period of exhalation.

The valve casing 71 is provided with a fixed end wall closure 72 having a series of perforations or valve ports 73 which are normally closed by the flap valve member 74 made of rubberized fabric, or the like. A conduit 75 is also provided for connection to the flexible conduit 16 and face mask 17 as shown in Fig. 1 of the drawings.

The other or open end of the valve casing 71 is seated upon the valve seat 76 having an annular groove 77 as shown. Interposed between the valve chamber 71 and the valve seat 76 is a valve diaphragm 78 comprised of rubberized fabric or the like. The valve diaphragm 78 is provided with perforations 79 adapted to register with the annular groove 77 of the valve plate 76. Fastened to the center of the valve diaphragm 78 in a manner to be actuated by movements of the valve diaphragm is a bell crank lever arm 80 for actuating the spring pressed poppet valve 81 which opens and closes communication between interior of the bellows 70 and the atmosphere through the port 82.

During each period of inhalation, negative pressure is created within the valve chamber 71 causing the flap valve 74 to seat tightly against the ports 73 and preventing communication between the subject's respiratory system and the atmosphere (Fig. 9). At the same time, the valve diaphragm 78 is bowed upwardly due to the negative pressure in the valve chamber 71 and communication is established between the patient's respiratory system and the air or gas within the interior of the expansible chamber 70 through the annular groove 77, the valve ports 79, valve chamber 71 and conduit 75 (Fig. 9). The upward bowing of the valve diaphragm 78 also moves the bell crank lever 80 to the position shown in Fig. 9 of the drawings to thus cause the poppet valve 81 to seat and to close communication between the atmosphere and the interior of the expansible chamber 70. Thus the entire volume of gases inhaled by the patient is supplied from the interior of the expansible chamber 70 which is retracted to a degree corresponding to the volume of inhaled gases.

During each period of exhalation, positive pressure is created within the valve chamber 71 causing the valve member 74 to be moved upwardly and causing the exhaled gases to pass from the valve chamber 71 through the valve ports 73 to the atmosphere. At the same time, the valve diaphragm 78 is bowed downwardly as shown in Fig. 10 to fit tightly against the valve seat 76, preventing passage of exhaled gases into the expansible chamber 70. At the same time, the bell crank 80 is moved to the position shown in Fig. 10 of the drawings to cause the poppet valve 81 to be opened and permit atmospheric pressure to enter the bellows 70 and the bellows expands.

The inhalation inlet ports 63 (Figs. 1 to 7) and 82 (Figs. 8 to 10) may be connected to a source of air, oxygen, anesthetic gas or any other gas or gases which it is desired to have the patient inhale, and the apparatus will function satisfactorily so long as such source of gas is under a substantially constant pressure.

While the apparatus of this invention has been specifically described in connection with its use for measuring the volumes of recurring periods of respiration of a patient, it should be understood that the invention is equally well suited for use in measuring the volumes of recurrent flows of any fluid.

It is apparent that the indicating devices 83, 84, 85, 86, 87 and 88 of Fig. 8 may be substituted for the indicating devices 19, 20, 21, 22, 23 and 24 in the embodiment of Figs. 1 to 7 inclusive, and conversely, the indicating device of Figs. 1 to 7 may be substituted for the indicating device in the embodiment of Figs. 8 to 10.

It is also apparent that a spring or equivalent means may be utilized to urge the expansible chamber to expanded or contracted position either with or without the aid of gravity.

From the foregoing it will be apparent that I have provided a novel and efficient apparatus for measuring the volumes of periodically recurring fluid flows; that such apparatus is suitable for embodiment in artificial respirators now in common use to measure the volumes of either the inhaled or the exhaled gases so that the respirator may be adjusted to provide the desired depth of inhalation and exhalation; that the apparatus is adapted for operation without interference with continuous respiration of the patient; and that the apparatus is simple and economical in construction and simple and economical in operation.

While I have shown and described two desirable embodiments of the invention, it is to be understood that such disclosure is for the purpose of illustration only and that various changes in shape, proportion and arrangement of parts and the substitution of equivalent elements may be made without departing from the spirit and scope of the invention as set forth in the appended claims.

I claim:

1. Apparatus for measuring the volumes of periodically recurring first and second fluid flows comprising an expansible chamber, first valve mechanism operative by the pressure of each first recurring fluid flow to open communication between the interior of said chamber and the fluid flow substantially upon the commencement of each of said first recurring fluid flows and operative by the change of pressure created by each second recurring fluid flow to close said communication after cessation of each of said first recurring fluid flows, and second valve mechanism operative by said change of pressure created by each of said second recurring fluid flows to open communication between the interior of said chamber and a source of fluid under a substantially constant pressure after the cessation of each of said expansible chamber or bellows 14. The valve mechanism is also operative to open communication between the interior of the expansible chamber and the atmosphere during each period of inhalation by the patient so that the expansible chamber 14 is collapsed or retracted and substantially exhausted in response to the force of gravity acting upon the weight of the top of the expansible chamber and associated parts during each period of inhalation. If desired a spring may be utilized to normally urge the expansible chamber to collapsed position either alone, or, when the chamber is arranged to collapse downwardly as shown, then a spring may supplement the force of gravity. The pointer 24 carried by the expansible chamber rises during each exhalation to indicate the increase in volume caused by the flow of exhaled gases to the interior of the expansible chamber and it indicates on the scale 22 the successive volumes of the successive exhalations. After each exhalation the pointer 24 returns to zero since it is attached to the rod 19. Thus the effectiveness of the artificial respirator to induce respiration is indicated by the maximum position of the pointer 24 on the scale 22 during each period of exhalation of the patient.

Referring to Figs. 2 to 6 of the drawings, a more detailed description of the valve mechanisms in the valve chamber 15 will now be given. The lower end of the expansible chamber or bellows 14 is sealed and secured to the metal valve seat 51 by the metal ring 50. The valve seat 51 is seated upon the upper end of the tubular valve chamber 15 and held thereon by the compression bolts 52 which also hold the lower valve seat 53 against the lower end of the valve chamber 15. Interposed between the valve seat 51 and the valve chamber 15 is a disk-like flap valve or diaphragm 54 made of rubberized fabric or other suitable material. The diaphragm 54 is provided with valve ports 55 which are normally closed by the disk-like flap valve or diaphragm 56 and which may also be made of rubberized fabric. The flap valve 56 is fastened at its center to the upper surface of the valve diaphragm 54 by a spot of adhesive 56a.

The valve seat 51 is provided with an annular groove 57 communicating at regular intervals with the exhaust valve ports 58 which are spaced around the periphery of the valve seat 51. The lower end of the expansible chamber 14, the ring 50, the valve seat 51 and the outer edge of the valve diaphragm 54 are also held in superimposed positions by the four bolts 50a and nuts 50b, so that the valve chamber 15 may be removed from the upper portion of the assembly (by loosening the bolts 52) without disassembly of the latter.

A disk-like flap valve or diaphragm 60 of rubberized fabric, or other suitable material, is interposed between the lower valve seat 53 and the lower edge of the valve chamber 15 and this valve diaphragm is provided with perforations 61 positioned above an annular groove 62 in the valve seat 53.

In the operation of the embodiment shown in Figs. 1 to 7, the valves are in the position shown in Fig. 3 of the drawings during each period of inhalation, at which time a negative pressure (i. e. below atmospheric) is created within the valve chamber 15 by the patient. Under such conditions, the valve diaphragms 54 and 60 are moved inwardly of the valve chamber 15 by the negative pressure, thus permitting air from the atmosphere to pass through the tubular passageway 63, around the edge of the valve seat 53, into the annular groove 62, through the valve ports 61 and into the valve chamber 15 as shown by the arrows on Fig. 3. This air passes from the valve chamber 15 through the conduit 64 into the flexible conduit 16 and thence to the patient's lungs. When the upper flexible valve diaphragm 54 is moved downwardly by the negative pressure in the valve chamber 51 to the position shown in Fig. 3, the gases within the expansible chamber 14 pass outwardly between the diaphragm 54 and the edge of the valve seat 51, into the annular groove 57 and through the exhaust ports 58 to the atmosphere and during this phase the chamber 14 is urged to collapsed position by gravity, moving downwardly from the dot-dash position of Fig. 2 to the full line position of Fig. 2.

Each exhalation causes positive pressure (i. e. above atmospheric) in the valve chamber 15 which forces the valve diaphragm 60 downwardly to fit tightly against the valve seat 53, thus closing the communication between the chamber 15 and the atmosphere (Fig. 4). Substantially simultaneously the positive pressure in the valve chamber causes the upper valve diaphragm 54 to move upwardly to the position shown in Fig. 4 of the drawings wherein it is seated tightly against the valve seat 51 and thereby closing communication between the atmosphere and interior of the expansible chamber 14. At substantially the same time, the positive pressure of the exhaled gases within the valve chamber 15 causes the outer portion of the valve member 56 to move upwardly as shown in Fig. 4 and the exhaled gases flow through the ports 55 into the expansible chamber 14 and it expands to indicate the volume of such exhaled gases as shown in dot-dash lines in Fig. 2.

During each inhalation and each exhalation of the patient, the above described cycle of operations is automatically repeated and thus a series of periodic indications of each respiratory volume is indicated without interference with the breathing process.

Instead of providing an expansible chamber which is operative to indicate the volume of exhaled gases, a modified form may be used which is operative to indicate the volume of inhaled gases. Such a modification is shown in Figs. 8 to 10 of the drawings. In such embodiment the expansible chamber or bellows 70 may be supported at its upper end from the valve chamber or box 71 with its lower or free end 70a normally urged to expanded position by gravity as shown in Fig. 8. If desired a spring may be utilized to normally urge the expansible chamber to expanded position either alone, or, when the chamber is arranged to expand downwardly as shown, then a spring may supplement the force of gravity. An indicating arm 83 is pivotally connected at 83a to the movable end 70a of the expansible chamber 70. The arm 83 is fulcrumed at 84 upon the fixed support 85 and its free end is provided with an indicating pencil or stylus 86 which cooperates with the recording surface 87 of a drum which is mounted for revolution in the direction of the arrow about a vertical shaft 88.

The valve mechanisms associated with the valve chamber or casing 71 are designed to permit each exhaled volume of gas from the patient to pass to the atmosphere and to cause the bellows 70 to expand during each exhalation when communication is opened between the interior of the bellows and a source of gas under substanfirst recurring fluid flows and operative by the pressure of each of said first recurring fluid flows to close the latter communication substantially upon resumption of each of said first recurring fluid flows, whereby the volume of each of said recurring fluid flows is indicated by the corresponding amount of displacement of said expansible chamber.

2. The apparatus of claim 1 wherein the source of fluid under a substantially constant pressure is the atmosphere.

3. The apparatus of claim 1 wherein the expansible chamber comprises a relatively rigid wall which is movable responsive to variations of pressure within the expansible chamber.

4. Apparatus for measuring the volumes of recurring periods of respiration comprising an expansible chamber, first valve mechanism operative by the pressure of the first period of each respiration to open communication between the interior of said chamber and the patient's respiratory system substantially upon the commencement of said first period of each respiration and operative by the change of pressure created by each second period of each respiration to close said communication after cessation of each of said first periods, and second valve mechanism operative by the change of pressure created by each second period of each respiration to open communication between the interior of said chamber and a source of fluid under a substantially constant pressure after cessation of each of said first periods and valve mechanism operative by the pressure of the first period of each respiration to close the latter communication substantially upon resumption of each of said first periods, whereby the volume of each of said recurring first periods of respiration is indicated by the corresponding amount of displacement of said expansible chamber.

5. The apparatus of claim 4 wherein the source of fluid under a substantially constant pressure is the atmosphere.

6. The apparatus of claim 4 wherein the expansible chamber comprises a relatively rigid wall which is movable responsive to variations of pressure within the expansible chamber.

7. Apparatus for measuring the volume of periodically recurring first and second fluid flows comprising an expansible chamber, valve mechanism operative by the pressure of each first recurring fluid flow to open communication between the interior of said chamber and the fluid flow substantially upon the commencement of each of said first recurring fluid flows, valve mechanism operative by the change of pressure created by each second recurring fluid flow to close said communication after cessation of each of said first recurring fluid flows and mechanism operative to substantially exhaust the interior of said chamber during the period between the cessation and resumption of each of said first recurring fluid flows, whereby the volume of each of said first recurring fluid flows is indicated by the corresponding amount of expansion of said expansible chamber.

8. Apparatus for measuring the volumes of periodically recurring first and second fluid flows comprising an expansible chamber, valve mechanism operative by the pressure of each first recurring fluid flow to open communication between the interior of said chamber and the fluid flow substantially upon the commencement of each of said first recurring fluid flows, valve mechanism operative by the change of pressure created by each second recurring fluid flow to close said communication after cessation of each of said first recurring fluid flows and mechanism operative to substantially fill the interior of said chamber with fluid under a substantially constant pressure during the period between the cessation and resumption of each of said first recurring fluid flows, whereby the volume of each of said first recurring fluid flows is indicated by the corresponding amount of retraction of said expansible chamber.

9. Apparatus for measuring the volumes of recurring periods of exhalation comprising an expansible chamber, valve mechanism operative to open communication between the interior of said chamber and the patient's respiratory system upon the commencement of each period of exhalation, valve mechanism operative to close said communication upon cessation of each period of exhalation, valve mechanism operative to open communication between the interior of said chamber and a source of fluid under a substantially constant pressure upon cessation of each of said periods of exhalation and valve mechanism operative to close the latter communication upon resumption of each of said periods of exhalation, whereby the volume of each of said recurring periods of exhalation is indicated by the corresponding amount of expansion of said expansible chamber.

10. Apparatus for measuring the volumes of recurring periods of inhalation comprising an expansible chamber, valve mechanism operative to open communication between the interior of said chamber and the patient's respiratory system upon the commencement of each period of inhalation, valve mechanism operative to close said communication upon cessation of each period of inhalation, valve mechanism operative to open communication between the interior of said chamber and a source of fluid under a substantially constant pressure upon cessation of each period of inhalation and valve mechanism operative to close the latter communication upon resumption of each period of inhalation, whereby the volume of each of said recurring periods of inhalation is indicated by the corresponding amount of retraction of said expansible chamber.

11. Apparatus for measuring the volumes of recurring periods of respiration comprising an expansible chamber, a flap valve operative to open communication between the interior of said chamber and the patient's respiration system upon the commencement of one period of each respiration and to close said communication upon cessation of each of said periods and valve mechanism operative to open communication between the interior of said chamber and a source of fluid under a substantially constant pressure upon cessation of each of said periods and to close the latter communication upon resumption of each of said periods, whereby the volume of each of said recurring periods is indicated by the corresponding amount of displacement of said expansible chamber.

12. Apparatus for measuring the volume of periodically recurring first and second fluid flows comprising an expansible chamber, valve mechanism responsive to each of said first fluid flows to open communication between the interior of said chamber and the fluid flow upon the commencement of each of said first recurring fluid flows, valve mechanism responsive to each of said second fluid flows to close said communication after cessation of each of said first recurring fluid flows, valve mechanism responsive to each of said second fluid flows to open communication between the interior of said chamber and a source of fluid under a substantially constant pressure after cessation of each of said first recurring fluid flows and valve mechanism responsive to each of said first fluid flows to close the latter communication upon resumption of each of said first recurring fluid flows, whereby the volume of each of said first recurring fluid flows is indicated by the corresponding amount of displacement of said expansible chamber.

13. Apparatus for measuring the volumes of recurring periods of respiration comprising an expansible chamber, valve mechanism responsive to the pressure of the first period of each respiration to open communication between the interior of said chamber and the patient's respiratory system, valve mechanism responsive to the pressure of the second period of each respiration to close said communication upon cessation of each of said first periods, valve mechanism responsive to the pressure of said second period of each respiration to open communication between the interior of said chamber and a source of fluid under a substantially constant pressure upon cessation of each of said first periods and valve mechanism responsive to the pressure of said first period of each respiration to close the latter communication upon resumption of each of said first periods, whereby the volume of one of each of said recurring periods is indicated by the corresponding amount of displacement of said expansible chamber.

14. The apparatus of claim 13 wherein the source of fluid under a substantially constant pressure is the atmosphere.

15. The apparatus of claim 13 wherein the expansible chamber comprises a relatively rigid wall which is movable responsive to variations of pressure within the expansible chamber.

16. Apparatus for continuously indicating respiratory gas volumes comprising an expansible chamber, a valve chamber adapted to be continuously connected to the respiratory system of a patient, a first valve in said valve chamber having two operable positions, the first of said positions effecting a connection between the interior of said valve chamber and the interior of said expansible chamber and the second of said positions effecting a closure of said first connection and exhausting said chamber, said first valve being movable responsive to the alternate periods of respiration, and a second valve in said valve chamber having two operable positions, the first effecting a connection between the valve chamber and the atmosphere and the second effecting a closure of said latter connection and mechanism operative to indicate the displacement of the expansible chamber.

17. Apparatus for measuring the volumes of periodically recurring fluid flows into a patient's lungs comprising an expansible chamber normally urged to expanded position, a rigid valve chamber communicating with the patient's lungs, first valve mechanism operative by inhalation of the patient to open communication between the interiors of said expansible chamber and said rigid chamber, second valve mechanism operative by inhalation of the patient to close communication between the interior of said rigid chamber and the atmosphere and third valve mechanism operative by inhalation of the patient to close communication between the interior of said expansible chamber and a source of fluid under substantially constant pressure, said first valve mechanism being operative by exhalation of the patient to close said first communication, said second valve mechanism being operative by exhalation of the patient to open said second communication and said third valve mechanism being operative by exhalation of the patient to open said third communication, whereby the volume of each of said recurring fluid flows into the patient's lungs is indicated by recurrent travel of the expansible chamber.

18. The apparatus of claim 17 wherein the atmosphere is the source of fluid under substantially constant pressure which is intermittently admitted to the interior of said expansible chamber by operation of said third valve mechanism.

19. Apparatus for measuring the volumes of periodically recurring fluid flows out of a patient's lungs comprising an expansible chamber normally urged to retracted position, a rigid valve chamber communicating with the patient's lungs, first valve mechanism operative by exhalation of the patient to open communication between the interiors of said expansible chamber and said rigid chamber, second valve mechanism operative by exhalation of the patient to close communication between said rigid chamber and a source of fluid under substantially constant pressure and third valve mechanism operative by exhalation of the patient to close communication between the interior of said expansible chamber and the atmosphere, said first valve mechanism being operative by inhalation of the patient to close said first communication, said second valve mechanism being operative by inhalation of the patient to open said second communication and said third valve mechanism being operative by inhalation of the patient to open said third communication, whereby the volume of each of recurring fluid flows out of the patient's lungs is indicated by recurrent travel of the expansible chamber.

20. The apparatus of claim 19 wherein the atmosphere is the source of fluid under substantially constant pressure which is intermittently admitted to the interior of said rigid chamber.

JOHN H. EMERSON.

REFERENCES CITED

The following references are of record in the file of this patent:

UNITED STATES PATENTS

| Number | Name | Date |
|---|---|---|
| 642,149 | McKenzie | Jan. 30, 1900 |
| 2,089,432 | Ryan | Aug. 10, 1937 |